UNITED STATES PATENT OFFICE.

EDWIN BURGES WATSON, OF LONDON, ENGLAND, ASSIGNOR TO THE FOODS ENRICHMENT SYNDICATE, LIMITED, OF SAME PLACE.

MANUFACTURE OF FLOUR, &c.

SPECIFICATION forming part of Letters Patent No. 617,266, dated January 3, 1899.

Application filed March 29, 1898. Serial No. 675,600. (No specimens.)

*To all whom it may concern:*

Be it known that I, EDWIN BURGES WATSON, food specialist, a subject of the Queen of Great Britain, residing at Vellore, Mowbray road, Upper Norwood, London, county of Surrey, England, have invented certain new and useful improvements in the manufacture of a flour or meal suitable for use as a foodstuff and for mixing with wheaten flour and other foodstuffs, of which the following is a specification.

This invention relates to improvements in the manufacture of a flour or meal suitable for use as a foodstuff and for mixing with wheaten flour and other foodstuffs.

The said invention has reference more particularly to the manufacture of a pure, white, and palatable flour or meal from the nuts or seeds commonly known as "peanuts" or "ground-nuts" and termed in botany "*Arachis hypogœa.*" At the present time an oil is extracted from these nuts or seeds which serves as a substitute for olive-oil, and after such extraction there is left behind a cake of compressed material of a highly-nutritious character, but unsuitable as an article of human food, partly on account of the debris of the husks and skins and other impurities it contains, which give to it a dark color and other objectionable qualities, and partly on account of the presence therein of the germs of the nuts or seeds, which are liable to set up fermentation, particularly if incorporated with such articles as wheaten flour.

Now according to my invention I subject the nuts or seeds after removal of the husks and prior to the oil-extraction process to a treatment which removes from them their coverings or skins and also the whole or the greater part of the germs, leaving behind only the clean white portion or body of the nuts or seeds, or when I prefer to retain the germs I render the fermentive elements in them inert by scalding or by the application of steam. By this treatment after the nuts have been pressed to effect the extraction of the oil a clean white cake is left behind, which when ground up gives a palatable flour or meal of a highly-nutritious character adapted either to be eaten alone or to be mixed with or added to other articles of food for the purpose of enriching them.

It is well known that many of the food grains most commonly used for human food are deficient in flesh-formers. This deficiency is accentuated in their flour products, notably in wheaten flour, in which a heavy percentage of the flesh-forming elements is eliminated to meet the demand for a white flour. My improved flour or meal can be mixed with ordinary white flour—say in the proportion of one to ten—without danger of impairing the color of bread or other articles made therewith and with the advantage of materially increasing the nutritive and digestive properties thereof. The said flour or meal can also in some cases be used as a substitute for starch—for example, in the manufacture of cocoa preparations.

According to one method of carrying out the invention I subject the nuts or seeds in a suitable oven, heater, or heating-chamber, preferably after the removal of their shells, to a dry heat, such as that of air heated to a temperature which the nuts will bear without danger of coagulating the albumen compounds in them or deteriorating the quality of the oil to be extracted from the nuts or seeds or affecting the white color of the residuum to be obtained after pressing, a suitable temperature being, for example, rather less than 180° Fahrenheit. The nuts or seeds are kept at this temperature for some time, which causes them to swell or expand, after which they are allowed to cool, when the skins shrivel up and become loosened from the nuts or seeds. The latter are then placed in a revolving screen or other suitable decorticating apparatus, whereby the skins are finally removed. The removal of the skins and the action of the decorticating-machine have the effect of detaching and removing the greater part of the germs of the nuts or seeds, and the final separation of the said germs can be effected by sifting or by other suitable means.

According to another method of carrying out the invention, applicable more especially in cases where I prefer to retain the germs in the residuum, I subject the said nuts or seeds, preferably after removal of their shells, to a moist or damp heat by scalding or the application of steam for a sufficient period—say for about ten minutes—at 212° Fahrenheit, or thereabout, to render inert the fermentive elements contained in the germ. This scalding or steaming process does not injure the color of the residuum to be obtained after pressing, and it renders the skin of the nuts or seeds easily removable by ordinary mechanical means, after which the nuts or seeds are dried before pressing. The nuts are now ready to have the oil extracted from them, which is done by pressure in the ordinary way, after which they can be ground up or pulverized to form the flour or meal before referred to.

In manufacturing this flour or meal heat may be applied to drive off moisture or to develop flavor or to modify the color. I may also in some cases add to the flour or meal a small quantity of the hypophosphites of lime or soda, or both, or other desirable food ingredients.

Having thus described my invention, what I claim, and desire to secure by Letters Patent of the United States, is—

1. The process described for producing a foodstuff from peanuts, or ground-nuts, which consists in subjecting said nuts to a preliminary heating operation, decorticating the heated nuts, separating the removed skins, eliminating the germ life, extracting the oil from the nuts thus treated, and finally grinding the residue into flour, substantially as described.

2. A flour or meal suitable for food, produced by grinding peanuts, or ground-nuts, which have been heated and decorticated, have had their germ life eliminated, and have been subjected, prior to the grinding, to pressure in order to remove the oil to a suitable degree, substantially as described.

In testimony whereof I have hereunto set my hand, in presence of two subscribing witnesses, this 14th day of March, 1898.

EDWIN BURGES WATSON.

Witnesses:
   CHAS. B. BURDON,
   ARTHUR A. BERGIN.